US008804786B1

(12) United States Patent
Krupke

(10) Patent No.: US 8,804,786 B1
(45) Date of Patent: Aug. 12, 2014

(54) OPTICALLY-PUMPED SULFUR MONOXIDE MOLECULAR LASER

(76) Inventor: William F. Krupke, Pleasanton, CA (US)

(*) Notice: Subject to any disclaimer, the term of this patent is extended or adjusted under 35 U.S.C. 154(b) by 853 days.

(21) Appl. No.: 13/026,186

(22) Filed: Feb. 11, 2011

Related U.S. Application Data

(60) Provisional application No. 61/337,904, filed on Feb. 12, 2010.

(51) Int. Cl.
*H01S 3/22* (2006.01)
(52) U.S. Cl.
USPC ............. 372/55; 372/34; 372/60; 372/69; 372/70
(58) Field of Classification Search
USPC ............. 372/34, 55, 60, 69
See application file for complete search history.

(56) References Cited

U.S. PATENT DOCUMENTS

| | | | | |
|---|---|---|---|---|
| 4,099,138 | A | * | 7/1978 | Jeffers et al. ............. 372/89 |
| 5,073,896 | A | * | 12/1991 | Reid et al. ............. 372/59 |
| 5,452,317 | A | * | 9/1995 | Tabata et al. ............. 372/60 |
| 6,331,993 | B1 | | 12/2001 | Brown |

OTHER PUBLICATIONS

Gourevitch, A., et. al, "Continuous wave, 30 W laser-diode bar with 10 GHz linewidth for Rb laser pumping," Optics Letters, vol. 33, No. 7, Apr. 1, 2008, pp. 702-704.

Stuart, Brent C. and Cameron, Stewart T., "Production, Excitation, and Laser Dynamics of Sulfur Monoxide," J. Phys. Chem. 98, 11499-11511 (1994).
Barnes, I., et. al, "Chemiluminescence of SO Sensitized by O2," Chemical Physics Letters, vol. 67, No. 2,3, 310-313 (Nov. 15, 1979).
Setzer, K.D., et. al, "High-Resolution Fourier Transform Study of the b1sigma+→x3sigma- and a1sigma→x3sigma Transitions of SO," Journal of Molecular Spectroscopy, 198, 163-174 (1999).
Cordes, Heinrich, et. al, "On Sulfur Monoxide," Trans. Faraday London, vol. 30, 31 pp. 31-33 (1934).
Colin, R., "The b1sigma+—x3sigma band system of SO," Canadian Journal of Physics, vol. 46, 1539-1546 (1968).
Wildt, J., et. al, "Radiative Lifetime and Quenching of SO (b1sigma+, v'=0)," Chemical Physics, vol. 80, 167-175 (1983).

* cited by examiner

*Primary Examiner* — Dung Nguyen
(74) *Attorney, Agent, or Firm* — Spano Law Group; Joseph S. Spano

(57) ABSTRACT

An optically pumped sulfur monoxide (SO) molecular laser is presented. A near infrared pump light source generates a pump light at wavelengths that match wavelengths of a Q-branch or R-branch absorption transition of a b $^1\Sigma^+$ excited electronic state of the SO molecule. The pump light is directed to a vessel containing a laser gain medium including gaseous SO and a buffer gas. The gaseous gain medium may be flowed through the region of output light extraction to remove waste heat deposited in the medium. In some examples output light is generated from any of the R-branch, Q-branch, or P-branch emission transitions between the v=0 vibrationless b $^1\Sigma^+$ electronic state and the v=1 vibrational x $^3\Sigma^-$ ground electronic state. In some other examples, output light is generated from P-branch emission transitions between the v=0 vibrationless b $^1\Sigma^+$ electronic state and the v=0 vibrationless x $^3\Sigma^-$ ground electronic state.

28 Claims, 11 Drawing Sheets

LASER OSCILLATOR ARCHITECTURE

LASER OSCILLATOR ARCHITECTURE

MASTER-OSCILLATOR, POWER AMPLIFIER ARCHITECTURE

OPTICALLY-PUMPED SULFUR MONOXIDE MOLECULAR LASER

CROSS REFERENCE TO RELATED APPLICATION

The present application for patent claims priority under 35 U.S.C. §119 from U.S. provisional patent application Ser. No. 61/337,904, entitled "Optically-Pumped Sulfur Monoxide Molecular Laser," filed Feb. 12, 2010, the subject matter of which is incorporated herein by reference.

TECHNICAL FIELD

The described embodiments relate to molecular laser based optical sources and systems.

BACKGROUND INFORMATION

Currently, all high average power lasers (e.g., >>100 kW average power) with high beam quality (e.g., $M^2 \approx 1$) utilize gaseous laser gain media (e.g., $CO_2$, CO, HF, DF, and $O_2$—I). Although technologically well developed, their widespread deployment has been and is expected to be quite limited. In many high energy laser (HEL) applications deployment is limited because their mid-infrared output wavelengths (e.g., $CO_2$, CO, HF, DF) are considered to be too long for intended applications, requiring excessively large-aperture transmitter optics that are both bulky and expensive. In addition, those sources powered by chemical reactions (e.g., HF, DF, $O_2$—I) pose unacceptable operational safety risks and logistical field supply chain difficulties. Furthermore, the power gain media of these chemically based sources are incapable of storing excitation energy over long (e.g., multiple millisecond) durations. This precludes short duration (e.g., less than 100 nanoseconds), high energy output pulse generation needed in some high power laser applications.

Another type of laser was explored two decades ago to achieve high average power with short duration, high peak power pulses based on the use of the diatomic molecule sulfur monoxide. In this SO laser, a 193 nm argon fluoride (ArF) pulsed discharge laser was used to photodissociate sulfur dioxide ($SO_2$) molecules to produce vibrationally excited, ground level SO molecules and atomic oxygen atoms. Then a 248 nm krypton fluoride discharge laser was used to resonantly excite a high lying (UV) SO electronic state. Laser action takes place between the pumped UV electronic state and a rotational-vibrational manifold of the ground electronic state. Because the efficiencies of the ArF and KrF discharge lasers are so low (a few percent), and because the conversion of KrF pump energy to SO laser output energy is so low (<<1%), the overall efficiency of this type of SO laser is impractically low and has remained a scientific curiosity. Furthermore, the radiative lifetime (i.e. maximum energy storage lifetime) of the high lying (UV) SO electronic state is only 35 nanoseconds.

A number of advanced laser technologies have been evaluated during the past two decades in various attempts to overcome the limitations cited above. These include: 1) high power semiconductor laser diodes, 2) Diode Pumped Solid State lasers (DPSSLs), and 3) Diode Pumped Alkali Lasers (DPALs).

A high power semiconductor laser diode, or an array of such diodes, is a powerful, efficient and compact laser source. However, such a laser diode or array source emits its output radiation in a beam that is many times greater than the diffraction limit of the emitting aperture. Thus, the radiation from such a semiconductor laser diode source cannot be propagated to a small spot at a large distance. Moreover, the semiconductor gain medium can only store excitation energy for a few nanoseconds. This generally precludes semiconductor laser diodes from generating high energy output pulses directly. For at least these reasons, semiconductor laser diodes, employed as direct sources of laser radiation, fail to overcome the beam quality and high peak energy pulse generation limitations of high power, high energy chemical lasers.

Notwithstanding these limitations, high power semiconductor laser diode and diode arrays can be used to optically excite the energy levels of a separate gain medium that may be capable of: 1) generating a high power CW output laser beam that is nearly diffraction-limited (often described as a "spatial mode converter"), and 2) storing the applied pump energy for long time durations suitable for generating high energy laser output pulses.

The semiconductor laser diodes containing Al, Ga, In, and As emit settable, relatively narrowband radiation in the 730-1100 spectral region. Semiconductor laser diodes can be designed to emit at wavelengths matched to well known absorption transitions of solid state laser materials, such as neodymium doped crystals and glasses, and ytterbium doped crystals and glasses. Thus, semiconductor laser diodes and diode arrays can be used to efficiently pump (excite) a rare earth doped solid state laser medium, producing a population inversion between certain levels therein. When the excited gain medium is contained within an appropriately designed laser resonator, a high fraction of the excitation energy may be extracted from the solid state gain medium. Because rare earth doped solid state gain media can store excitation energy over long durations (e.g., hundreds of microseconds to milliseconds), high energy output laser pulses may be realized in DPSSLs.

However, waste heat generated in a DPSSL due to internal loss processes must be transported to a heat sink positioned away from the laser gain region so as to not overly distort the output laser beam. In a solid state gain medium this heat transport must be achieved through the process of thermal conduction in the gain medium itself. This inevitably results in thermally-induced index-of-refraction gradients transverse to the laser resonator axis. These gradients deteriorate output beam quality, especially under high average power operation. It has proven difficult to mitigate this mechanism of output beam deterioration. Thus, DPSSLs with high beam quality remain power limited.

The DPAL was developed to exploit the power, compactness, and efficiency of semiconductor laser diodes while overcoming the thermally-induced beam quality distortion limitations of DPSSLs by utilizing atomic alkali atoms in the vapor phase as gain media. DPALs are electrically pumped and emit at shorter wavelengths than any of the aforementioned chemical gas and DPSSL lasers. However, a vapor gain medium introduces significant operational limitations related to controlling conditions at a liquid or solid alkali reservoir to generate the desired vapor conditions during operation. Moreover, the upper laser levels of the alkali atoms employed in DPALs possess relatively short energy storage lifetimes (e.g., approximately 30 nanoseconds). Thus, DPALs generally cannot be designed to produce the short duration, high energy output pulses required by a number of high energy, high power applications.

Thus, there is a continuing need for a non-chemical, electrically-powered, short-wavelength laser using a purely gaseous (i.e., non-vapor) gain medium that may be scaled to multi-kilowatt and above power levels with near diffraction-limited beam quality. Furthermore, it is desirable that the gaseous gain medium be able to store optical pump energy for a relatively long time (e.g., multiple milliseconds) to enable production of high energy, high-peak-power pulses on a repetitive basis.

SUMMARY

An optically pumped sulfur monoxide (SO) molecular laser includes a near infrared pump light source that generates a pump light at wavelengths that match wavelengths of any of Q-branch and R-branch absorption transitions of a b $^1\Sigma^+$ excited electronic state of the SO molecule. In some examples, pump light is generated at approximately 950 nanometers. In some other examples, pump light is generated at approximately 955 nanometers. The pump light is directed to a vessel containing a laser gain medium including gaseous SO and a buffer gas.

In one aspect, laser output light is generated on any of the R-branch, Q-branch, and P-branch emission transitions between the v=0 vibrationless b $^1\Sigma^+$ electronic state and the v=1 vibrational x $^3\Sigma^-$ ground electronic state. In one example, laser output light is extracted at a wavelength of approximately 1070 nanometers.

In another aspect, laser output light is generated on P-branch emission transitions between the v=0 vibrationless b $^1\Sigma^+$ electronic state and the v=0 vibrationless x $^3\Sigma^-$ ground electronic state. In one example, laser light is extracted at a wavelength of approximately 965 nanometers.

In yet another aspect, the gaseous gain medium may be flowed through the region of output light extraction to remove waste heat deposited in the medium.

In yet another aspect, output light may be extracted by a plurality of SO lasers. Each SO laser may be configured to extract output light from the laser gain medium at different wavelengths. The output of each of the plurality of SO lasers is gathered by an optical lens system and focused to a single spot in the far field.

In some embodiments an optically pumped SO laser is configured as a laser oscillator. In one example, a laser resonator cavity spans a portion of the laser gain medium. For at least some period of time, the laser resonator cavity has a high quality factor at a wavelength that matches a wavelength of any of a P-branch, Q-branch, or R-branch emission transitions between the b $^1\Sigma^+$ excited electronic state and the x $^3\Sigma^-$ ground electronic state.

In some other embodiments an optically pumped SO laser is configured as a master oscillator, power amplifier (MOPA). In one example, a master oscillator generates a low energy or power light at a wavelength that matches an emission transition of the SO molecule. The low energy or power light is directed through a vessel containing the excited laser gain medium pumped by the near infrared pump light source. The low energy or power light extracts energy from the excited laser gain medium, thus amplifying the light emitted from the master oscillator. This amplified light is emitted as output light from the SO laser.

In some embodiments, the near infrared pump light source is a semiconductor laser diode or diode array. In some embodiments, the pump laser may be configured in a pulsed mode. In some other embodiments, the pump laser may be configured in a continuous wave mode.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein, as defined solely by the claims, will become apparent in the non-limiting detailed description set forth herein.

DETAILED DESCRIPTION

Reference will now be made in detail to background examples and some embodiments of the invention, examples of which are illustrated in the accompanying drawings.

In one novel aspect, a gas laser that is optically pumped in the near infrared may be realized having near-diffraction-limited output beams with both high peak and average power. The sulfur monoxide (SO) hetero-nuclear diatomic molecule serves as the active gain species. Some spectroscopic characteristics of the SO molecule are described to better understand the operational characteristics of the novel optically pumped SO molecular laser.

Figure 1:
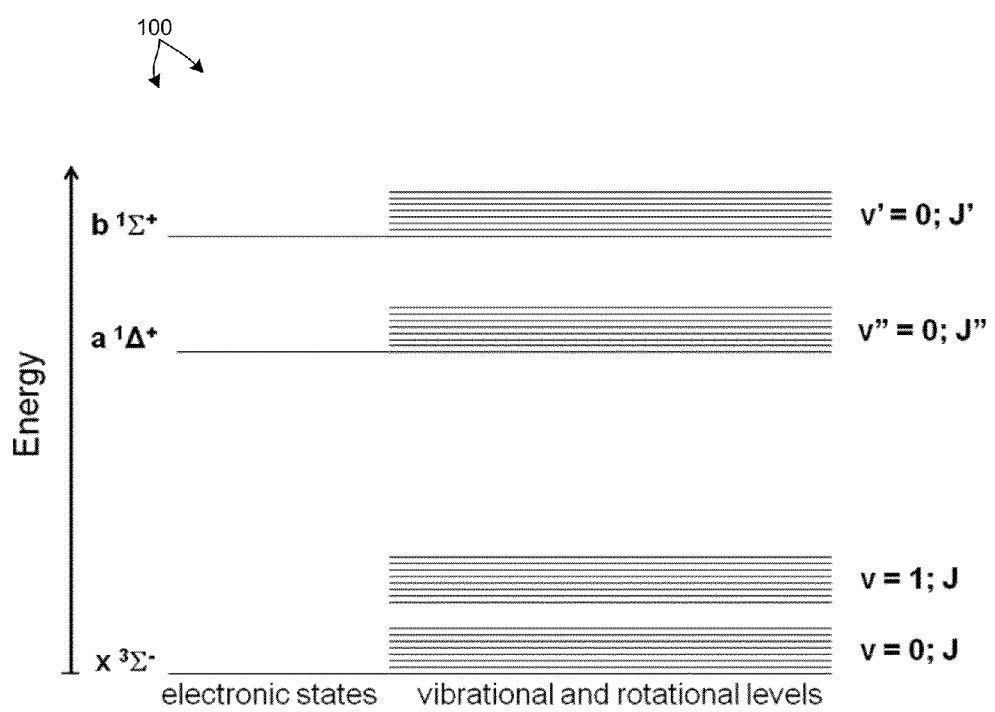
FIG. 1 is a diagram illustrative of the energy states of the sulfur monoxide (SO) diatomic molecule lying below 12,000 cm$^{-1}$.

FIG. 1 is a diagram 100 illustrative of the energy states of SO lying below 12,000 wavenumbers (cm$^{-1}$). The total energy of an individual SO molecule is comprised of its electronic, vibrational, and rotational energies. The energies of the three electronic states, x $^3\Sigma^-$, a and b $^1\Sigma^+$, are shown on the left hand side of FIG. 1. SO rotational levels are shown schematically as a ladder of closely spaced horizontal lines on the right hand side of FIG. 1. Each individual rotational level associated with the ground electronic state, x $^3\Sigma^-$, is designated by the symbol J. Each rotational level associated with the excited electronic states, a $^1\Delta^+$ and b $^1\Sigma^+$, is designated by the symbol J" and J', respectively. The SO rotational energy constant is B~0.7 cm$^{-1}$. At room temperature, an SO molecule in any of its electronic states will be in rotational motion as well. Thus, an SO molecule will have a manifold of rotational levels associated with it.

The energy of the quantum of vibration in the SO molecule is approximately 1050 cm$^{-1}$, so that at room temperature an SO molecule in any of its electronic states may or may not exhibit vibrational motion. A vibrational level associated with the ground electronic state, x $^3\Sigma^-$, is designated by the symbol v. Each vibrational level associated with the excited electronic states, a $^1\Delta^+$ and b $^1\Sigma^+$, is designated by the symbol v" and v', respectively. When no vibrational motion is present in the ground electronic state, x $^3\Sigma^-$, this condition is designated by v=0. Similarly, when no vibrational motion is present in the excited electronic states, a $^1\Delta^+$ and b $^1\Sigma^+$, this condition is designated by v"=0 and v'=0, respectively. When one quanta of vibrational motion is present in the ground electronic state, x $^3\Sigma^-$, this vibrational level is designated by v=1. Analogously, when one quanta of vibrational motion is present in the excited electronic states, a $^1\Delta^+$ and b $^1\Sigma^+$, this condition is designated by v"=1 and v'=1, respectively. Thus, a complete description of the energy level of a SO molecule includes a statement of its electronic state, its vibrational level, and its rotational level.

Figure 2:
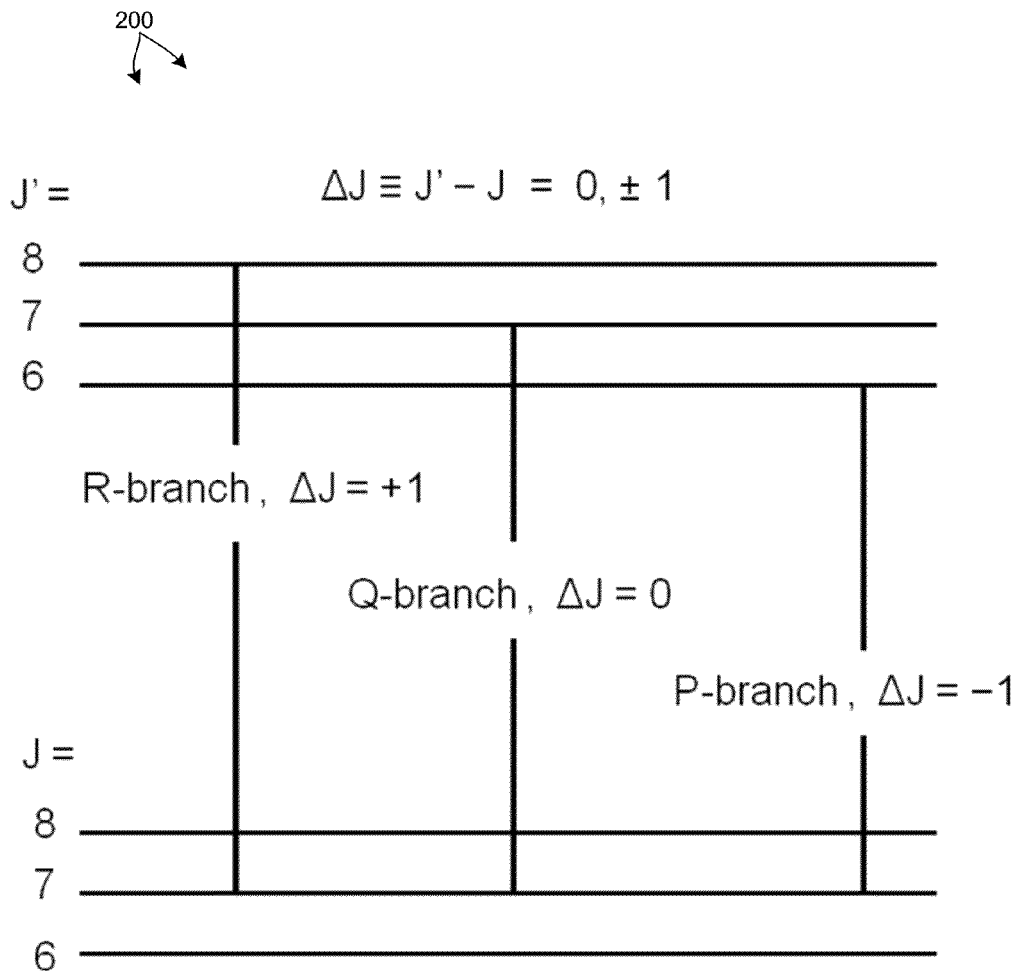
FIG. 2 is a diagram illustrative of the allowed Q, R, and P branch transitions between rotational manifolds of two electronic states of a diatomic molecule.

By way of example, FIG. 2 is a diagram 200 illustrative of the three types of optical transitions allowed between electronic states of a diatomic molecule such as SO. FIG. 2 illustrates the J'=6, 7, 8 rotational levels of the rotational manifold of an excited electronic state (e.g., the b $^1\Sigma^+$ electronic state illustrated in FIG. 1). FIG. 2 also illustrates the J=6, 7, 8 rotational levels of the rotational manifold of a diatomic molecule in the ground electronic state (e.g., the x $^3\Sigma^-$ electronic state illustrated in FIG. 1). Selection rules for optical transitions between these two electronic states give rise to three types of allowed optical transitions in accordance with the rule $\Delta J=J'-J=0, \pm 1$. The transition is labeled a "Q-branch" transition when $\Delta J=0$, an "R-branch" transition when $\Delta J=+1$, and a "P-branch" transition when $\Delta J=-1$.

Figure 3:
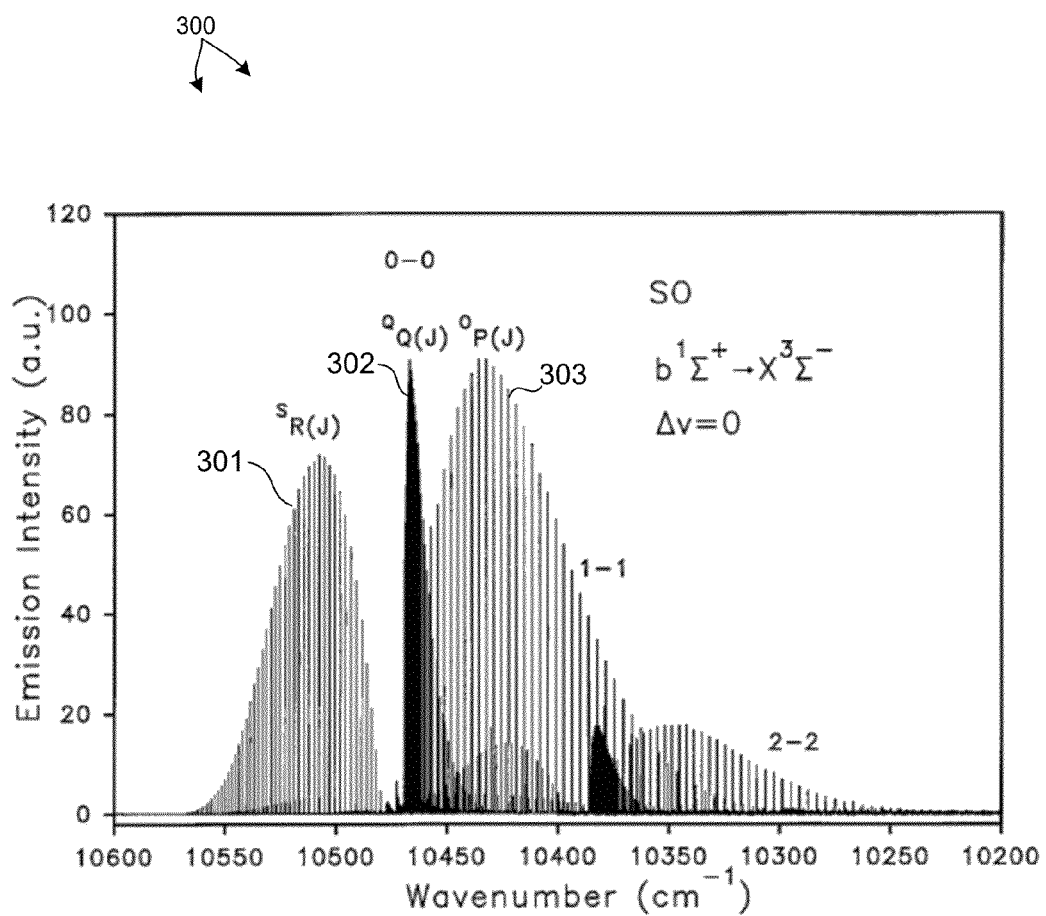
FIG. 3 is a diagram illustrative of the b $^1\Sigma^+$–x $^3\Sigma^-$ Q, R, and P branch emission spectrum of the SO molecule.

FIG. 3 is a diagram 300 that illustrates the $\Delta J$ selection rules and shows the allowed Q branch 302, R branch 301, and P branch 303 emission spectra of SO for transitions from the b $^1\Sigma^+$ excited electronic state to the x $^3\Sigma^-$ ground electronic state. The spectra are plotted for the case when there is no change in vibrational quantum number v (e.g., a transition from a vibrationless v'=0 level of the b $^1\Sigma^+$ excited electronic state to a vibrationless v=0 level of the x $^3\Sigma^-$ ground electronic state). Additional information is described in "High-Resolution Fourier Transform Study of the b$^1\Sigma^+ \to$ X$^3\Sigma^-$ and a$^1\Delta \to$ X$^3\Sigma^-$ Transitions of SO," Journal of Molecular Spectroscopy, 198, 163-174 (1999) by K. D. Setzer, et al., the entirety of which is incorporated herein by reference.

With reference to the aforementioned discussion of spectroscopic characteristics of the SO molecule, we now turn to a description of a novel near infrared pumped SO laser in various embodiments and examples.

In one novel aspect, the various examples and embodiments of a near infrared pumped SO laser described in this patent document involve transitions between the x $^3\Sigma^-$ ground electronic state and the b $^1\Sigma^+$ excited electronic state. By way of example, the a electronic state illustrated in FIG. 1 does not play a significant role in the novel near infrared pumped SO laser described in this patent document. Similarly, other electronic states (not shown) do not play a significant role in the novel near infrared pumped SO laser described in this patent document.

In a first specific example, the pumping of the SO laser results in a transition between the v=0 vibrationless level of the x $^3\Sigma^-$ ground electronic state and the v'=0 vibrationless level of the b $^1\Sigma^+$ excited electronic state. Furthermore, the emission of the SO laser is a result of the laser transition between the v'=0 vibrationless level of the b $^1\Sigma^+$ excited electronic state to the v=1 vibrational level of the x $^3\Sigma^-$ ground electronic state.

In a second specific example, the pumping of the SO laser results in a transition between the v=0 vibrationless level of the x $^3\Sigma^-$ ground electronic state and the v'=0 vibrationless level of the b $^1\Sigma^+$ excited electronic state. Furthermore, the emission of the SO laser is a result of the laser transition between the v'=0 vibrationless level of the b $^1\Sigma^+$ excited electronic state to the v=0 vibrationless level of the x $^3\Sigma^-$ ground electronic state.

Figure 4:
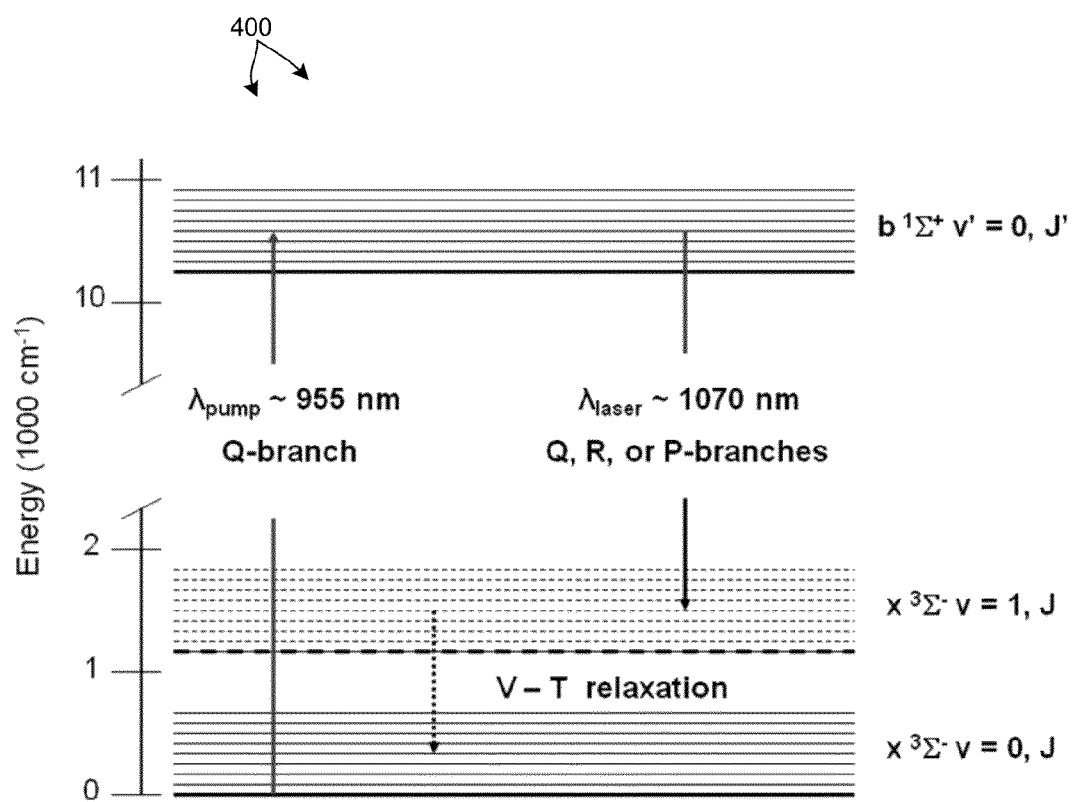
FIG. 4 is a diagram illustrative of a first energy level scheme employed in various embodiments of a near infrared pumped SO molecular laser.

FIG. 4 is a diagram 400 illustrative of the first energy level scheme employed in some embodiments of a SO laser. In this first scheme, SO molecules are optically pumped at wavelengths centered near 955 nm to match the Q-branch ($\Delta J=0$) absorption transitions from the v=0 vibrationless level of the x $^3\Sigma^-$ ground electronic state to the v'=0 vibrationless level of the b $^1\Sigma^+$ excited electronic state. This pumping creates a population inversion between the v'=0 vibrationless level of the b $^1\Sigma^+$ excited electronic state and the v=1 vibrational level of the x $^3\Sigma^-$ electronic state. Laser emission occurs in the Q, R, and P branch transitions between these states at wavelengths centered near 1070 nm.

Figure 5:
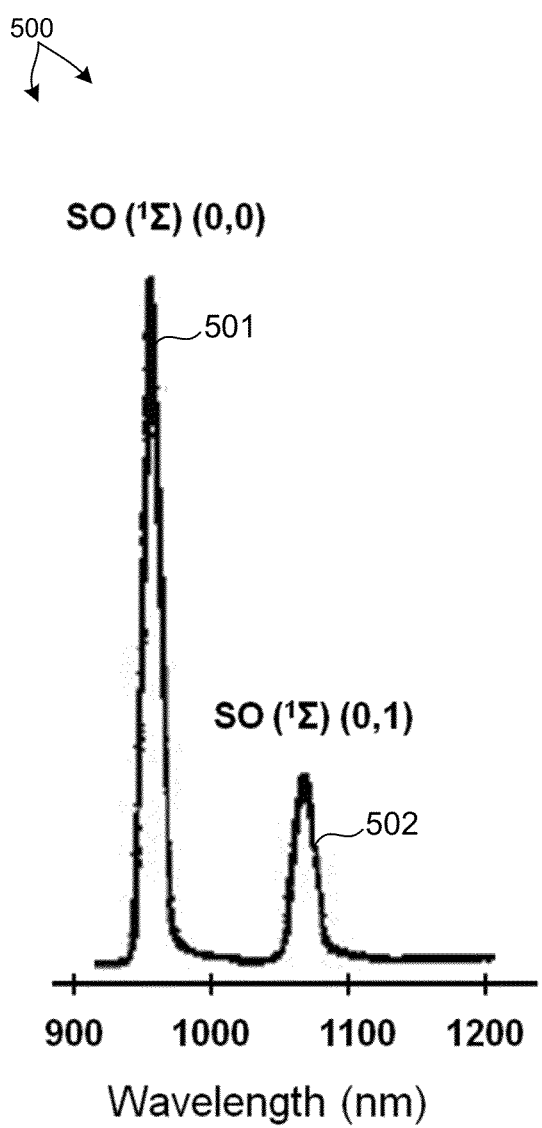
FIG. 5 is a diagram illustrative of a low resolution emission spectrum of SO in the spectral region from 900 to 1200 nm.

FIG. 5 is a diagram 500 illustrative of a low resolution emission spectrum of SO in the spectral region from 900 to 1200 nanometers that includes an aggregation of the contributions of the Q, R, and P branch transitions. Additional information is described in "Chemiluminescence of SO($^1\Delta_g$, $^1\Delta^+_g$) Sensitized by O$_2$($^1\Delta_g$)," Chem. Phys. Lett., 67, 310-312, (1979) by I. Barnes, et. al, the entirety of which is incorporated herein by reference). The stronger feature 501 near 955 nm is due predominately to Q-branch b $^1\Sigma^+$v'=0 to x $^3\Sigma^-$ v=0 transitions, but also includes R-branch and P-branch transitions. The weaker feature 502 near 1070 nm is due predominately to Q-branch b $^1\Sigma^+$v'=0 to x $^3\Sigma^-$ v=1 transitions, but also includes R-branch and P-branch transitions. Feature 501 corresponds to the pump transitions illustrated schematically in FIG. 4. Feature 502 corresponds to the laser transitions illustrated schematically in FIG. 4.

As illustrated in FIG. 5, effective pumping may be obtained by generating pump light with wavelengths between 930 nanometers and 980 nanometers. In one example, effective pumping may be achieved by generating pump light centered at 955 nanometers and ranging between 930 and 980 nanometers. Also, as illustrated in FIG. 5, effective extraction of laser light may occur at wavelengths ranging from 1040 nanometers and 1100 nanometers. In one example, laser light may be effectively extracted in a five nanometer waveband centered at 1070 nanometers. In another example, laser light may be effectively extracted in a 60 nanometer waveband centered at 1070 nanometers.

Figure 6:
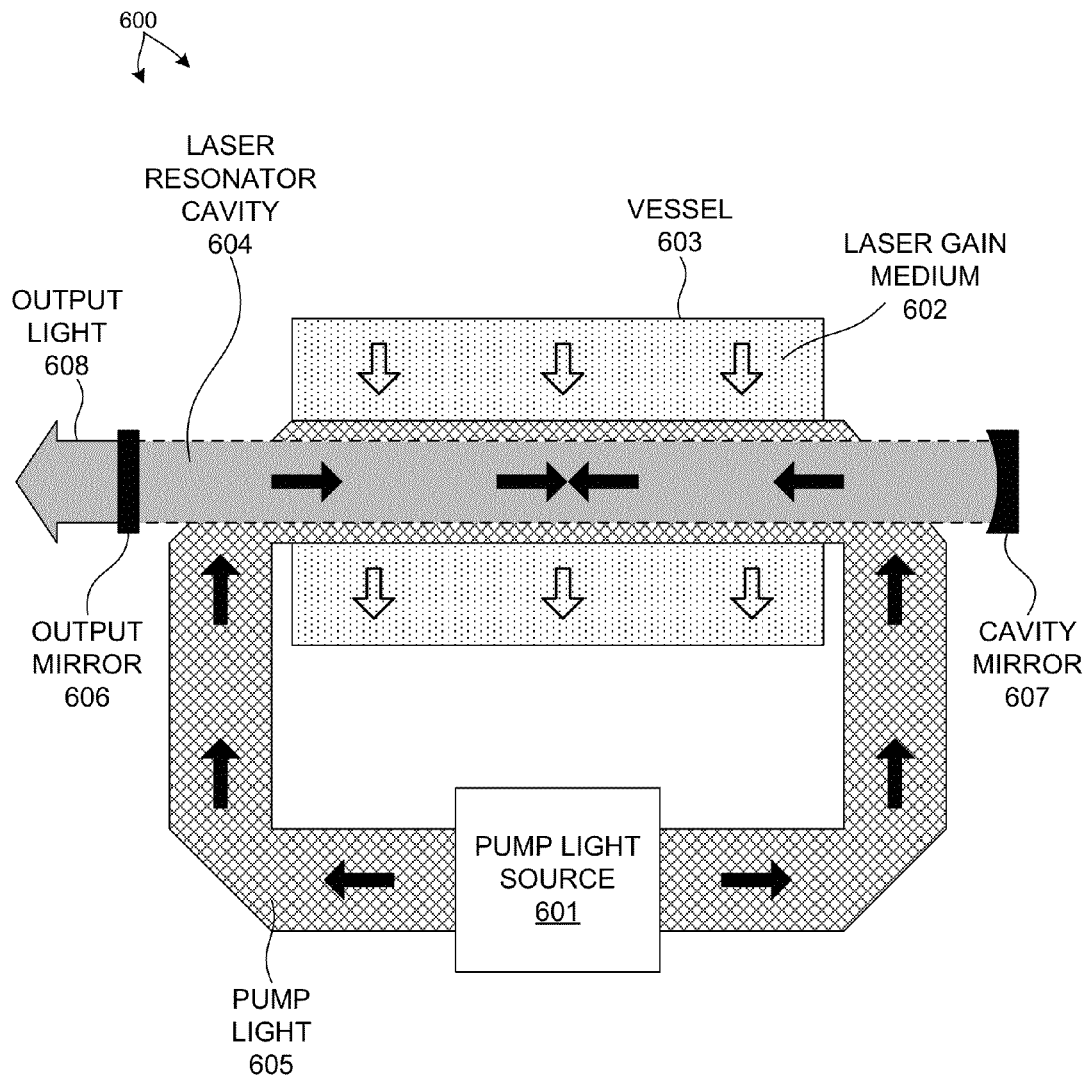
FIG. 6 illustrates a first embodiment of a near infrared pumped SO laser.

FIG. 6 depicts an embodiment of a near infrared pumped SO molecular laser 600 in at least one novel aspect. Near infrared pumped SO molecular laser 600 includes a near infrared pump light source 601, a laser gain medium 602 that includes gaseous sulfur monoxide mixed with at least one buffer gas (such as helium or argon), a vessel 603 that contains the laser gain medium 602, and an optical laser resonator cavity 604. Pump light source 601 generates a pump light that is directed through a portion of laser gain medium 602 contained in vessel 603. Pump light 605 includes wavelengths that substantially match the wavelengths of any of Q-branch and R-branch absorption transitions of the b $^1\Sigma^+$ excited electronic state of the molecules of the gaseous SO. Laser resonator cavity 604 includes an output mirror 606 and a highly reflecting cavity mirror 607 and spans a portion of laser gain medium 602. Laser resonator cavity 604 is configured to emit light resonant within the cavity as output light 608. Any of cavity mirror 607, output mirror 606, or additional optical elements (not shown) may be configured to filter light resonant within cavity 604 to select the waveband of output light 608. For example, a birefringent filter or a volume Bragg grating may be incorporated into the optical path of laser resonator cavity 604 to select the waveband of light extracted from cavity 604. By possessing a high quality factor at one or more wavelengths that match a wavelength of any of a P-branch, Q-branch, and R-branch emission transitions between the b excited electronic state and the x $^3\Sigma^-$ ground electronic state of an SO molecule, output light 608 may be efficiently extracted from laser resonator cavity 604.

The buffer gas has several purposes. One purpose is to ensure that the distribution of rotating SO molecules among rotational levels is that of a Boltzmann distribution at the gas kinetic temperature, for all time scales relevant to the SO laser. For example, for a helium partial pressure of 100 torr, Boltzmann equilibrium among SO rotational levels occurs within 0.4 nanoseconds. Additional information is presented in "Production, Excitation, and Laser Dynamics of Sulfer Monoxide," J. Phys. Chem., 98, 11499 (1994) by B. C. Stuart, et. al, which is incorporated herein in its entirety by reference. Another purpose of the buffer gas is to act as a heat bath for non-radiative dissipative energy losses in the gain mixture. Yet another purpose of the buffer gas is to suitably collisionally-broaden pump transitions to facilitate efficient coupling of pump radiation by SO molecules.

In one embodiment, the near infrared pump light source 601 (e.g., an array of InGaAs laser diodes) emits pump radiation at a wavelength, $\lambda_{pump}$, of approximately 955 nm. This substantially matches the wavelength(s) of Q-branch electronic absorption transition(s) of the SO molecule. This nominal pump transition wavelength is addressable by semiconductor laser diodes formed from the mature, practical InGaAs material system. The spectral width of the diode pump array can be rendered similar to that of the SO molecular absorption transition by affixing volume Bragg gratings (VGBs) or other types of grating elements to the array, examples of which are described in "Continuous wave, 30 watt, laser diode bar with 10 Ghz linewidth for Rb laser pumping," Optics Letters, 33(7), 702-704 (2008) by A. Gourevitch, et al., the entirety of which is incorporated herein by reference.

Q-branch pumping may be advantageous because of the substantial overlap of multiple Q-branch transitions. For example, FIG. 3 illustrates a tight clustering of Q-branch transitions over a relatively small waveband. This may reduce the required spectral width of the pumping laser diode arrays. In operation the near infrared pump radiation is directed toward the vessel containing the gain mixture of gaseous SO and at least one buffer gas. The pump radiation is absorbed by the SO molecules. In one energy level scheme, the resulting excitation of the SO molecules produces a population inversion between the vibrationless (v'=0) excited b $^1\Sigma^+$ electronic state and the v=1 vibrational level of the ground x $^3\Sigma^-$ electronic state of the SO molecule, and generates laser output radiation from the laser resonator cavity at a wavelength, $\lambda_{laser}$, centered near approximately 1070 nm corresponding to Q($\Delta$J=0), or R($\Delta$J=+1) or P($\Delta$J=−1) branch transitions.

As illustrated in FIG. 6 it may be preferred to flow the laser gain medium 602 in a direction transverse to the length dimension of the laser resonator cavity 604. In one embodiment, the laser resonator cavity 604 spans a portion of laser gain medium 602 and its longitudinal axis is positioned perpendicular to a flow of laser gain medium 602. High beam quality at high power is greatly facilitated in these embodiments due to the fact that the gaseous gain medium can be flowed through the vessel and laser resonator cavity to convectively remove any waste heat generated in the gain medium.

Figure 7:
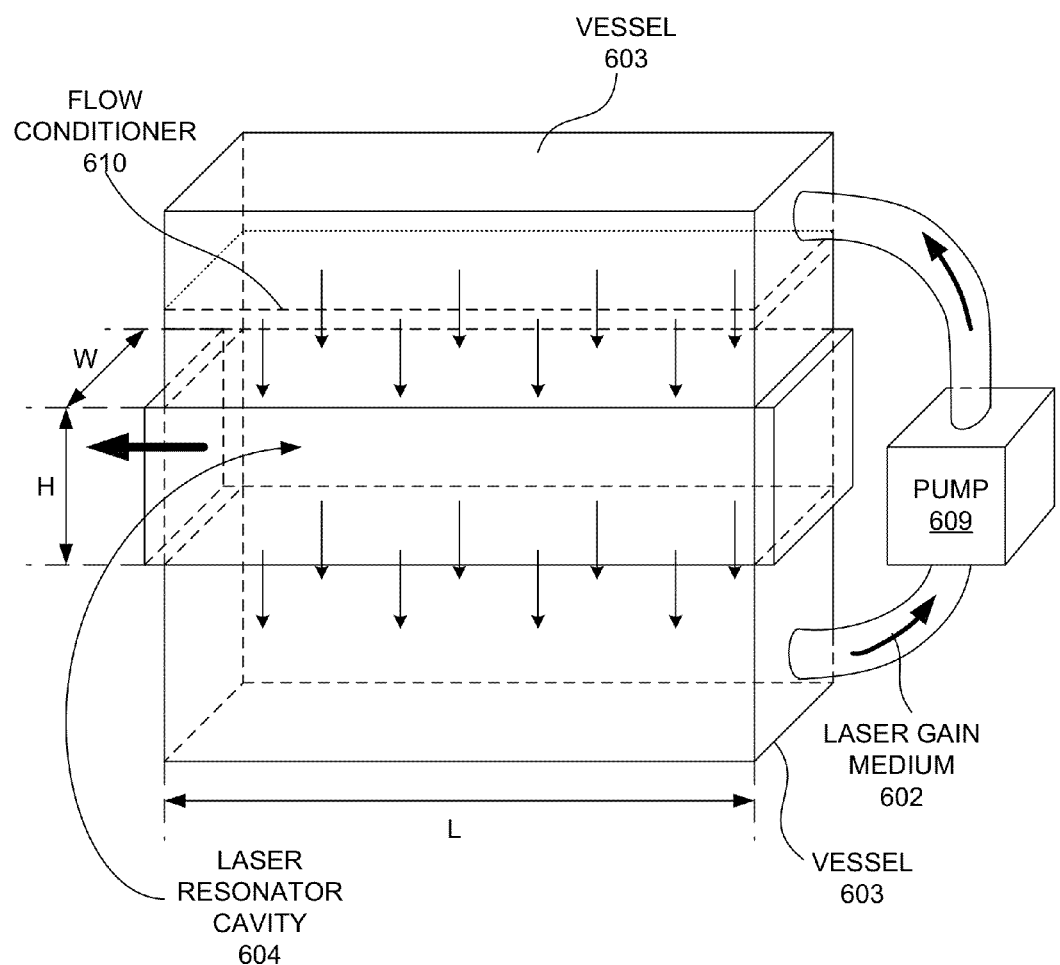
FIG. 7 is a diagram illustrative of a gas flow employed in various embodiments of a near infrared pumped SO molecular laser.

FIG. 7 illustrates an embodiment of a near infrared pumped SO molecular laser 600 that incorporates a flow of laser gain medium 602 transverse to the laser resonator cavity 604. As illustrated, laser resonator cavity 604 is configured in a rectangular shape with a length dimension, L, a height dimension, H, and a width dimension, W. This shape is illustrated for exemplary purposes and other shapes may be implemented. As illustrated, laser gain medium 602 is mechanically pumped by pump 609 through vessel 603 such that laser gain medium 602 flows uniformly across the length dimension of laser resonator cavity 604. In some embodiments, vessel 603 may include a flow conditioner 610 (e.g. a diffuser plate, a baffle, etc.) to promote uniform flow across the entirety of laser resonator cavity 604.

In some embodiments, free-running or continuous-wave (CW) laser radiation is extracted from the laser resonator. In other embodiments, the laser resonator cavity quality factor can be maintained at a low value while optical pumping is in progress, during which time the SO molecules will integrate and store pump energy. When pumping is terminated, the laser resonator quality factor can be suddenly switched to a higher value resulting in a high peak power pulsed output (i.e., Q-switching). The technique of mode-locking may also be implemented in embodiments using laser gain medium 602 in accordance with well-known techniques.

To realize a practical near infrared pumped SO laser it is necessary that the SO molecule possess optical transition cross-sections and collisional kinetic properties of appropriate magnitudes. Table 1 lists estimates of a number of spectroscopic and kinetic parameter values for a near infrared pumped sulfur monoxide molecular laser with assumptions of a b $^1\Sigma^+$v"=0 electronics state radiative lifetime of 5.7 milliseconds and a partial pressure of Argon buffer gas at 0.765 amagat. Additional estimates and related information are described in J. Wildt, et. al, "Radiative lifetime and quenching of SO (b $^1\Sigma^+$v"=0), Chem. Phys., 80, 167-175 (1983), R. Colin, "The b $^1\Sigma^{+-}$ x $^3\Sigma^{-ba}$nd system of SO", Canadian Journal of Physics, 46, 1539-1546 (1968), and H. Crodes and P. W. Schenk, "On Sulfur Monoxide", Trans. Faraday London, 30. 31-33 (1934), each of which is incorporated herein by reference in their entirety. Based on these values, a near IR pumped SO molecular laser should have aperture energy and power aperture scaling characteristics that are similar to well known practical laser sources.

TABLE 1

| Parameter | Value | Units |
|---|---|---|
| b $^1\Sigma^+$ v' = 0 radiative lifetime | 5.7 | msec |
| x $^3\Sigma^-$ v = 0; J to b $^1\Sigma^+$ v' = 0; J' effective absorption x-section | 1. × E−18 | cm$^2$ |
| b $^1\Sigma^+$ v' = 0; J' to x $^3\Sigma^-$ v" = 0; J" effective emission x-section | 6.7 × E−20 | cm$^2$ |
| Estimated Frank-Condon factor | 0.067 | |
| Pump ro-vibrational transition width (FWHM) | 3 | GHz |
| Laser saturation fluence | 2.7 | J/cm$^2$ |
| Laser saturation flux | 0.36 | kW/cm$^2$ |

There is a rich physical design space for a 955 nm diode-pumped SO laser involving tradeoffs among many parameters including: SO partial pressure, helium and/or argon buffer partial pressure, relative orientations of pump and laser output beams, gain medium flow direction (if the gain medium is flowed), and laser resonator cavity parameters. Design parameter choices will differ significantly between a continuous wave (CW) SO laser and an energy-storing, high-peak-power pulsed SO laser.

By way of illustrative example of the performance of an SO laser of the embodiment of FIG. 6, a high peak power, pulsed SO laser oscillator may be realized with an energy storage time, $\tau_{store}$, of approximately 5 milliseconds. Due to self-quenching, the highest SO partial pressure permitting this storage lifetime is estimated to be about 0.01 amagat, or 2.7×E17 molecules/cc.

If we assume that the laser gain medium is comprised of 0.01 amagat of SO gas and 0.765 amagat of argon buffer gas, then the pump transition linewidths and peak absorption cross-sections are determined. Note that the cross-sections given in Table 1 are defined relative to the total molecular population in the initial electronic state (assuming a temperature of 293 degrees C.). The rotational level population relaxation time is estimated to be approximately 500 picoseconds. For the SO partial pressure of 0.01 amagat, the pump transition absorption coefficient, $\alpha_{pump}$, is 0.27 cm$^{-1}$. Under this SO gas condition, the pump saturation flux is approximately 35 W/cm$^2$ and the pump saturation fluence is approximately 0.2 J/cm$^2$.

In the embodiment illustrated in FIGS. 6-7, the SO gaseous gain medium is flowed through a vessel. In one example, vessel 603 has a rectangular shape characterized by a height dimension, H, of 10 cm, a width dimension, W, of 10 cm, and a length dimension, L, of 1000 cm. Thus, the vessel end area is 100 cm$^2$ and the vessel volume is 100,000 cm$^3$. The instantaneous total number of SO molecules in the vessel is 2.7 E22.

The laser gain medium 602 within the vessel 603 is excited by pump radiation with a wavelength of approximately 955 nm from both ends (end-pumped geometry) at a sufficient flux to fully bleach the SO molecules. Under these assumptions the Beer's Law absorbance-length product along the long dimension of the vessel is approximately 270 (that is, fully opaque). (Note that the transverse Beer's Law absorbance-length product is 2.7 thus permitting the possibility of efficient transverse pumping of the vessel as well).

Given the three-fold larger degeneracy of the spin triplet character of x $^3\Sigma^-$ ground electronic state (initial state of the pump transition) compared to the degeneracy of the spin-singlet character of the excited b $^1\Sigma^+$ electronic state (terminal electronic state of the pump transition), roughly only 25% of all SO molecules can be optically excited into the b $^1\Sigma^+$ electronic state. This corresponds to a total number of excited SO molecules of 6×E21, requiring a total pump energy of approximately 1200 Joules. This amount of pump energy must be supplied through a total pump area of 200 cm$^2$ (two ends), for an average pump fluence of 6 J/cm$^2$. This fluence must be supplied in, by way of example, half the storage lifetime of SO or approximately 3 msec. Thus, the demand pump flux is approximately 2 kW/cm$^2$. This flux value readily may be obtained from a modern 2-D diode pump array. The demand pump flux under transverse pumping would be 100 times lower due to the greatly increased pumping area.

Since the v=1 vibrational level of the x $^3\Sigma^-$ ground electronic state (terminal electronic state of the laser transition) lies at approximately 1050 cm$^{-1}$ and is essentially thermally empty of population at room temperature, a substantial population inversion density is created. The exponential small signal gain coefficient, $\alpha_{laser}$, is estimated to be approximately 5×E-3 cm$^{-1}$, and the single-pass, small-signal gain, $\alpha_{laser}$L, of the 1000 cm long chamber is estimated to be 5. Since the degeneracy of the terminal laser manifold is three times that of the upper manifold, approximately 75% of the energy stored in the upper laser state can be extracted in a short (e.g., 10 nsec) pulse. In the present example this amounts to 0.9 kJ of output energy at an average fluence of 9 J/cm$^2$.

Because the laser gain medium is a gas, it can be flowed transverse to the chamber axis (along the 10 cm transverse dimension) between pump and extraction cycles (approximately 10 Hz rate) with a substantially subsonic flow velocity, e.g., approximately 10 m/sec. This flow contributes to high beam quality at high power by convectively removing waste heat generated in the gain medium and minimizing temperature gradients within the laser cavity.

Table 2 collects the aforementioned laser characteristic parameters with the assumption of a pump diode array efficiency of 55%.

TABLE 2

| Parameter | Value | Units |
|---|---|---|
| Gain medium aperture | 10 × 10 | cm × cm |
| Gain medium length | 1000 | cm |
| SO partial pressure | 0.01 | amagat |
| SO number density | 2.7 E17 | mol/cc |
| Ar partial pressure | 0.765 | amagat |
| Ar number density | 2.06 E19 | atoms.cc |
| Pump wavelength | ~955 | nm |
| Laser wavelength | 1070 | nm |
| Pump absorption coefficient | 0.27 | cm$^{-1}$ |
| Pump fluence | 6 | J/cm$^2$ |
| Pump flux | 2 | kW/cm$^2$ |
| Laser output fluence | 9 | J/cm$^2$ |
| Stored energy | 1200 | J |
| Output energy | 900 | J |
| Extraction efficiency | 75 | % |
| Optical-optical efficiency | 60 | % |
| Electrical efficiency | 33 | % |

High peak power SO laser pulses generated at a wavelength near approximately 1070 nm may be harmonically converted to other shorter wavelengths by well-known processes (e.g., second harmonic generation, third harmonic generation, fourth harmonic generation, etc.). In this manner, a shorter-wavelength, rep-pulsed high-average-power source with good beam quality may be realized. Furthermore, high peak power SO laser pulses generated at a wavelength near approximately 1070 nm may be converted to longer wavelengths by the well-known processes of optical parametric amplification or oscillation. In this manner, a longer-wavelength, rep-pulsed high-average-power source with good beam quality may be realized.

In addition to operating in an energy-storage, repetitively pulse mode of operation, such an SO laser oscillator may be operated in a purely continuous wave (CW) mode of operation, along with CW conversion to shorter wavelength harmonics, and longer wavelength parametric radiation.

Figure 8:
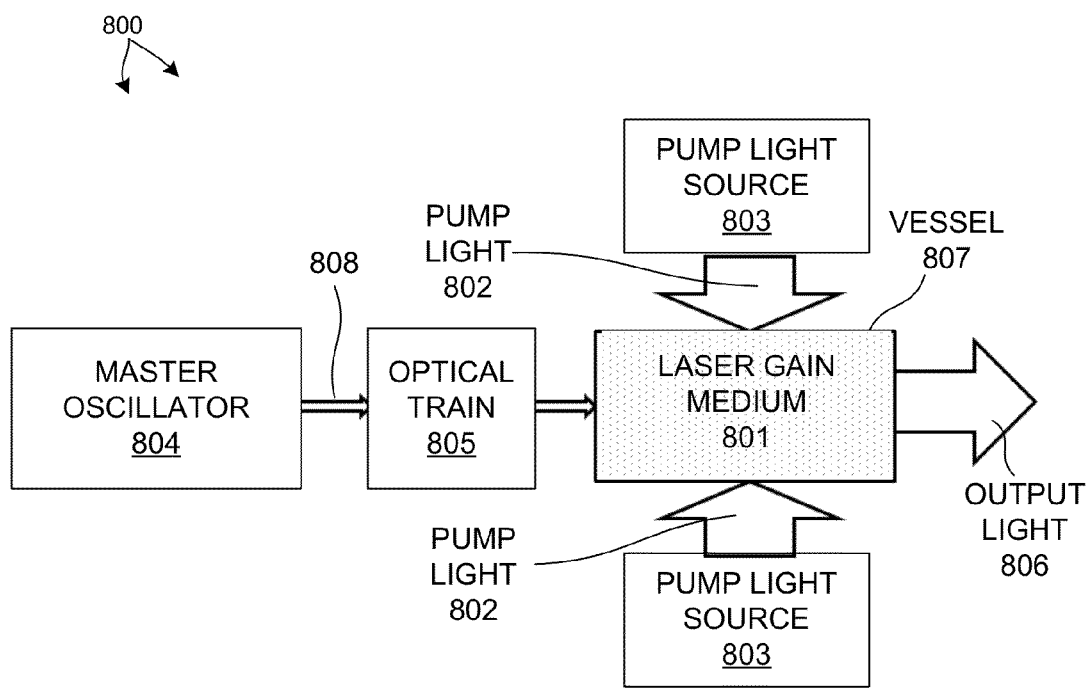
FIG. 8 is a diagram illustrative of a second embodiment of a near infrared pumped SO laser.

FIG. 8 is a diagram illustrative of a near infrared pumped SO laser system 800 in another novel aspect. A laser gain medium 801 contained in a vessel 807 includes gaseous SO and a buffer gas. Laser gain medium 801 is optically pumped by a pump light 802 generated by near infrared pump light source 803. System 800 is configured in a master-oscillator, power-amplifier (MOPA) configuration. In this configuration, a low-pulse-energy, low average power master oscillator 804 emits radiation at a wavelength that matches the wavelength of the desired SO laser transition. In other examples, master oscillator 804 emits low power radiation at a wavelength that matches the wavelength of the desired SO laser transition. In one example, the desired SO laser transition is approximately 1070 nanometers. The output radiation beam 808 of the master oscillator 804 is directed through vessel 807 via optical train 805. While passing through vessel 807, the output radiation beam of the master oscillator 804 interacts with the optically-excited laser gain medium 801 (either static or flowing) and extracts laser energy and power from the excited gain medium to generate output light 806. In this manner, vessel 807 containing optically-excited laser gain medium 801 acts as an optical power amplifier by amplifying the output radiation beam 808 and generating amplified output light 806. Any of the pump and laser transitions described in this patent document may be implemented in a MOPA architecture such as illustrated in FIG. 8.

Figure 9:
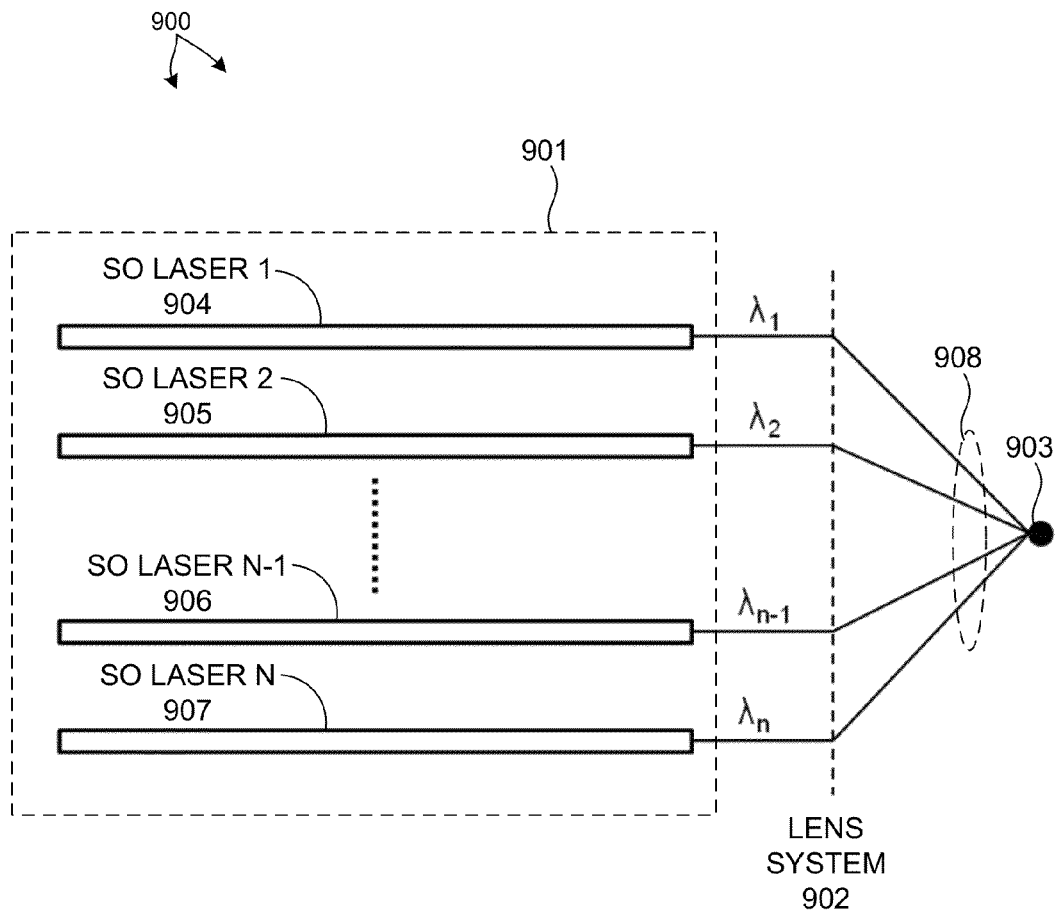
FIG. 9 is a diagram illustrative of a near infrared pumped SO laser in a third embodiment.

FIG. 9 is a diagram illustrative of a near infrared pumped SO laser system 900 in another novel aspect. Near infrared pumped SO laser system 900 includes a plurality 901 of SO lasers (e.g. SO laser 1 904, SO Laser 2 903, . . . SO laser N−1 906, and SO laser N 907) each generating output light with a different wavelength (e.g., $\lambda_1, \lambda_2, \ldots \lambda_{N-1}, \lambda_N$, respectively). Output light 908 generated from the plurality of SO lasers is collected and focused by a lens system 902 on a single spot in the far field 903.

In some embodiments, each SO laser may be a near infrared pumped SO laser resonator as described with reference to FIG. 6. In another example, each SO laser may be a near infrared pumped SO MOPA system as described with reference to FIG. 7). Each SO laser of the array 901 is designed to emit its output radiation differing in wavelength from each other member of the array 901. Because each SO laser radiation source in the array 901 has a different wavelength than the other sources in the array 901, the radiation 908 impinging on the far field spot 903 spans an effective spectral width given by the spectral span of the individual SO laser sources in the array 901. Although each SO laser of the array 901 may be a stand-alone laser with its own laser gain medium contained in its own vessel, other configurations and combinations may be contemplated. By way of example, in some embodiments, any number of SO lasers could share the same laser gain medium contained in a common vessel. In some embodiments, laser light could be extracted at each of the different wavelengths from the same portion of the laser gain medium. In some other embodiments, laser light could be extracted at each of the different wavelengths from different portions of the laser gain medium.

In one embodiment, each SO laser of system 900 is a near infrared pumped SO laser of the embodiment described with reference to FIG. 6. The performance of each SO laser is summarized in Table 2, as previously noted. Optical gain will be generated in a number of P-branch transitions whose wavelengths span the spectral range of approximately 60 wavenumbers (similar to the spectral span of the P-branch emission transitions illustrated in FIG. 3). By configuring an array 901 of SO lasers such that at least one laser extracts output light from a P-branch transition whose wavelength is on the shorter wavelength end of the 60 wavenumber span and at least one laser extracts output light from a P-branch transition whose wavelength is on the longer wavelength end of the 60 wavenumber span, a collected output light 908 with a broad effective spectral span can be obtained. In one example, the spectral span reaches across approximately 60 wavenumbers to achieve a spectral span with at least two Terahertz of effective bandwidth. In other examples the spectral span may reach across any number of wavenumbers to achieve a spectral span less than two Terahertz of effective bandwidth.

Figure 10:
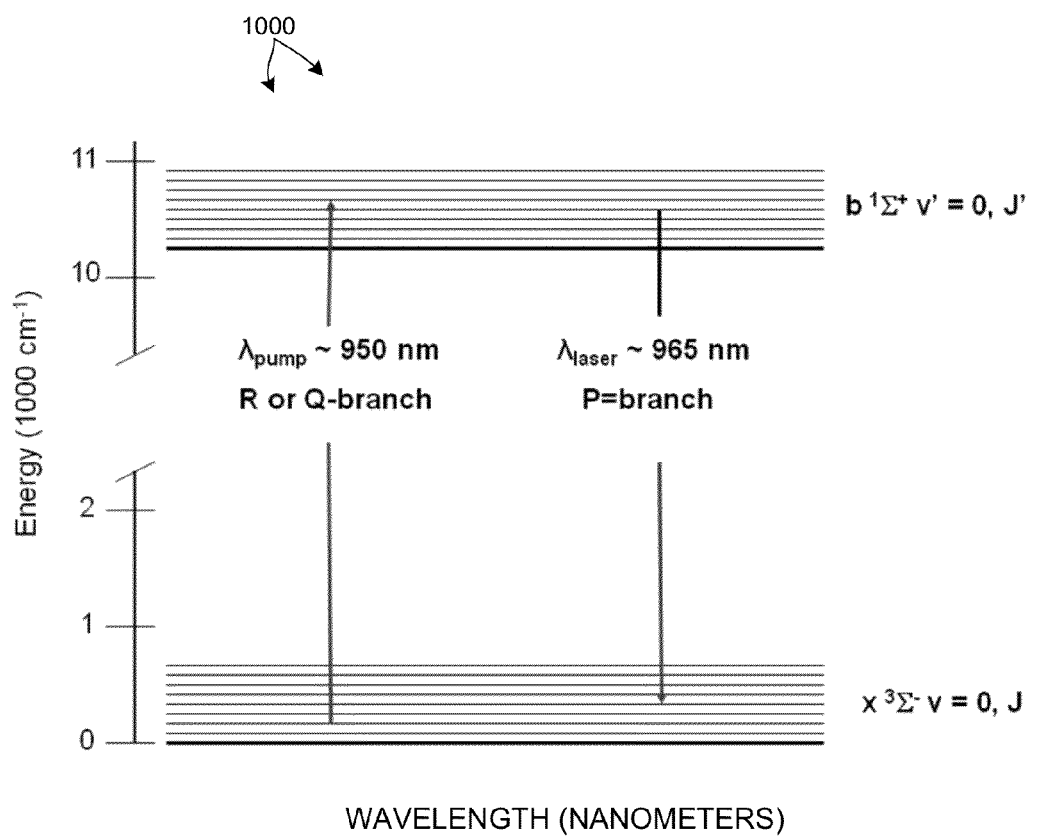
FIG. 10 is a diagram illustrative of a second energy level scheme employed in various embodiments of a near infrared pumped SO molecular laser.

FIG. 10 is a diagram 1000 illustrative of a second energy level scheme employed in some embodiments of a SO laser. In this second scheme, SO molecules are optically pumped as in the first scheme described with reference to FIGS. 4-5. Pumping occurs between the vibrationless levels of the x $^3\Sigma^-$ ground and b excited electronic states. In this second scheme, pumping may occur on any of Q-branch and R-branch transitions. FIG. 10 shows a pump wavelength centered at approximately 950 nm that corresponds to R-branch transitions. In other examples (not shown), pumping may occur at a pump wavelength centered at approximately 955 nm that corresponds to Q-branch transitions. By pumping the rotational populations of the vibrationless x $^3\Sigma^-$ ground electronic state to saturation on either R or Q branch transitions, it is possible to produce population inversions and laser action on P-branch transitions between certain rotational level populations in the vibrationless b $^1\Sigma^+$ excited electronic state and certain rotational level populations in the vibrationless x $^3\Sigma^-$ ground electronic state. Even though the ground state manifold of rotational levels retains significant thermal populations at room temperature, laser emission occurs in P branch transitions at wavelengths centered near 965 nanometers.

FIG. 3 shows Q, R, and P branch emission spectra of the vibrationless b $^1\Sigma^+$ to vibrationless x $^3\Sigma^-$ emission bands of SO at a spectral resolution of 0.02 $cm^{-1}$. In this second laser energy level scheme, the P-branch transitions 303 with nominal wavelengths of approximately 965 nanometers may be SO laser transitions when appropriately pumped in absorbing Q branch transitions 302 or R branch transitions 301.

As illustrated in FIG. 3, effective pumping may be obtained by generating pump light with wavelengths between 945 nanometers and 958 nanometers. In one example, effective pumping may be achieved by generating pump light centered at 950 nanometers (matching the peak of the R-branch transitions 301) and ranging between 945 and 955 nanometers. Also, as illustrated in FIG. 3, effective extraction of laser light generated from P-branch transitions 303 may occur at wavelengths ranging from 955 nanometers and 975 nanometers. In one example, laser light may be effectively extracted in a five nanometer waveband centered at 965 nanometers. In another example, laser light may be effectively extracted in a 20 nanometer waveband centered at 965 nanometers. Similarly, many other examples may be contemplated.

The second laser energy level scheme illustrated in FIG. 10 provides a number of benefits in comparison to the first laser energy level scheme illustrated in FIG. 4. Specifically: 1) a very small quantum energy defect exists between pump and laser photon energies, 2) less waste heat is generated, 3) the wavelength of laser operation is shorter, and 4) stimulated emission cross-sections are significantly larger than those of the first energy level scheme because the Franck-Condon factor is approximately unity. Near infrared pumped SO lasers utilizing this second energy level scheme may be implemented in the all of the aforementioned embodiments.

Figure 11:
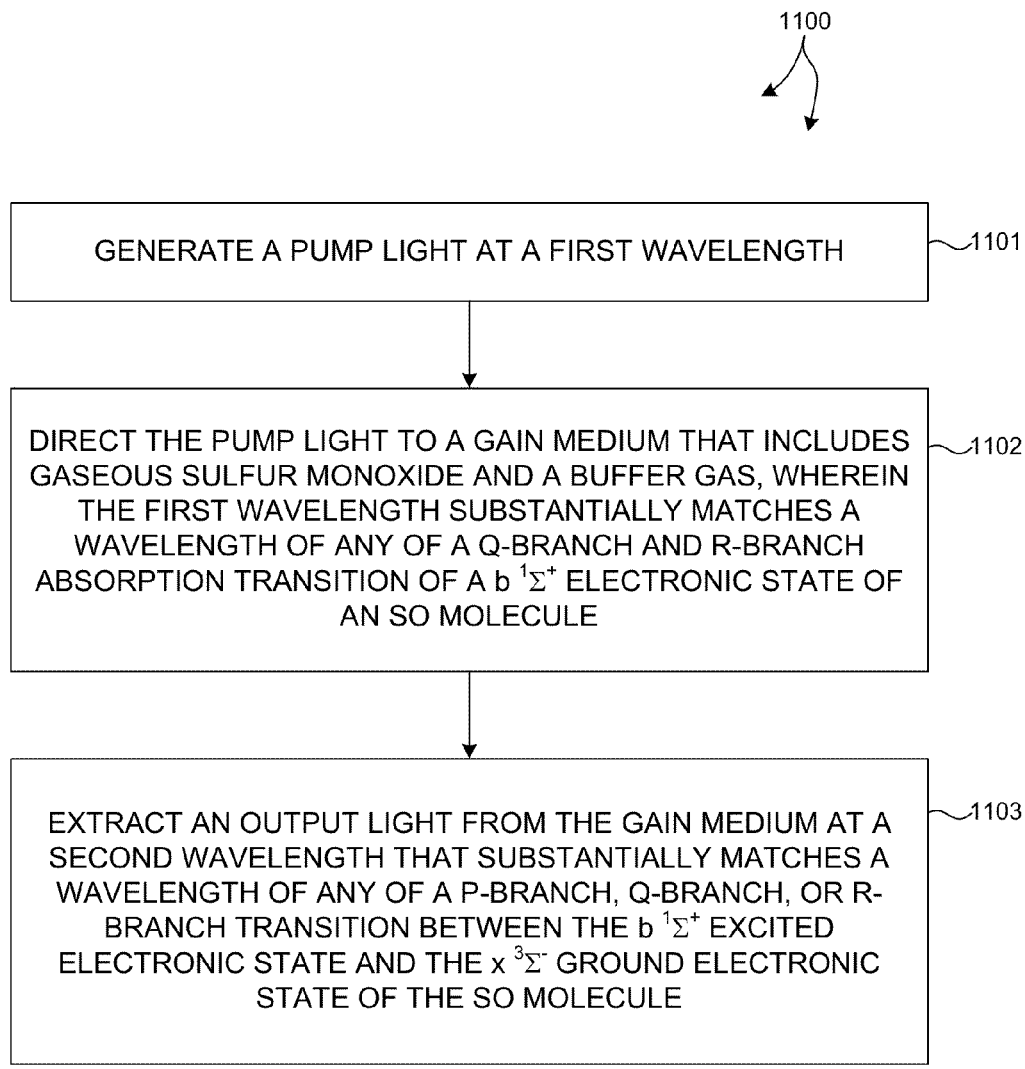
FIG. 11 is a flowchart illustrative of a method of generating laser output light from a near infrared pumped SO laser.

FIG. 11 is a flowchart illustrative of a method 1100 of generating output light from a near infrared pumped SO laser. In a first step (step 1101) a pump light at a first wavelength is generated. In a second step (step 1102) the pump light is directed to a laser gain medium that includes gaseous sulfur monoxide and a buffer gas. The first wavelength substantially matches a wavelength of any of a Q-branch and R-branch absorption transition of a b $^1\Sigma^+$ electronic state of a sulfur monoxide molecule. In a third step (step 1103) an output light is extracted from the laser gain medium at a second wavelength that substantially matches a wavelength of any of a P-branch, Q-branch, and R-branch emission transition between the b $^1\Sigma^+$ excited electronic state and the x $^3\Sigma^-$ ground electronic state of the sulfur monoxide molecule.

Although certain specific embodiments are described above for instructional purposes, the teachings of this patent document have general applicability and are not limited to the specific embodiments described above. For example, in addition to the laser oscillator and MOPA architectures described above, many variations of practical, well known laser device architectures can be employed in conjunction with a near infrared pumped SO gain medium to realize a SO molecular laser. For example a number of combinations of device architectures and operating modes may be employed to affect the temporal waveform of the output beam of a SO molecular laser (e.g., continuous wave, CW, free running, cavity dumped, Q-switched, and mode locked). In other examples, a number of combinations of device architectures and operating modes may be employed to affect the spatial quality of the output beam of a SO molecular laser. Furthermore, for purposes of this patent document, the terms "light" and "radiation" are used interchangeably and refer to electromagnetic radiation, generally.

Accordingly, various modifications, adaptations, and combinations of various features of the described embodiments can be practiced without departing from the scope of the invention as set forth in the claims.

What is claimed is:

1. An apparatus comprising:
    a laser gain medium comprising gaseous sulfur monoxide (SO) and at least one buffer gas;
    at least one vessel containing the laser gain medium; and
    a near infrared pump light source that generates a pump light of a first wavelength directed to the laser gain medium contained in the at least one vessel, wherein the first wavelength substantially matches a wavelength of any of a Q-branch and a R-branch absorption transition of a b $^1\Sigma^+$ excited electronic state of a molecule of the gaseous SO.

2. The apparatus of claim 1, further comprising:
    a first laser resonator cavity spanning a first portion of the laser gain medium contained in the at least one vessel, wherein the first laser resonator cavity possesses a high quality factor at a second wavelength matching a wavelength of any of a P-branch, Q-branch, or R-branch transition between the b $^1\Sigma^+$ excited electronic state and a x $^3\Sigma^-$ ground electronic state of the molecule of the gaseous SO.

3. The apparatus of claim 2, wherein the second wavelength matches an emission transition between a v'=0 vibrationless b $^1\Sigma^+$ electronic state of the molecule of the gaseous SO and a v=1 vibrational x $^3\Sigma^-$ ground electronic state of the molecule of the gaseous SO.

4. The apparatus of claim 3, wherein the first wavelength is approximately 955 nanometers and the second wavelength is approximately 1070 nanometers.

5. The apparatus of claim 2, wherein the second wavelength matches an emission transition between a v'=0 vibrationless b $^1\Sigma^+$ electronic state of the molecule of the gaseous SO and a v=0 vibrationless x $^3\Sigma^-$ ground electronic state of the molecule of the gaseous SO.

6. The apparatus of claim 5, wherein the first wavelength is approximately 950 nanometers and the second wavelength is approximately 965 nanometers.

7. The apparatus of claim 5, wherein the first wavelength is approximately 955 nm and the second wavelength is approximately 965 nanometers.

8. The apparatus of claim 2, wherein the laser resonator cavity operates in a temporal mode taken from the group consisting of: continuous wave, Q-switched, free-running, cavity dumped, and mode locked.

9. The apparatus of claim 1, wherein the near infrared pump light source is a semiconductor diode laser or diode array configured to operate in a temporal mode taken from the group consisting of: continuous wave and pulsed.

10. The apparatus of claim 1, wherein the laser gain medium is flowed through the at least one vessel to convectively remove waste heat deposited in the laser gain medium.

11. The apparatus of claim 2, further comprising:
    a second laser resonator cavity spanning a second portion of the laser gain medium, wherein the second laser resonator cavity possesses a high quality factor at a third wavelength matching a wavelength of any of a P-branch, Q-branch, and R-branch transition between the b $^1\Sigma^+$ excited electronic state and the x $^3\Sigma^-$ ground electronic state; and
    an optical lens system that gathers laser light emitted from the first and second laser resonator cavities and focuses the gathered laser light to a single spot in the far field.

12. The apparatus of claim 11, wherein the spectral span of the first and second wavelengths is less than two Terahertz.

13. The apparatus of claim 11, wherein the first portion of the laser gain medium and the second portion of the laser gain medium are the same portion of the laser gain medium.

14. A method comprising:
    generating a pump light of a first wavelength;
    directing the pump light to a gain medium that includes gaseous sulfur monoxide (SO) and a buffer gas, wherein the first wavelength substantially matches a wavelength of any of a Q-branch and a R-branch absorption transition of a b $^1\Sigma^+$ electronic state of a molecule of the gaseous SO; and
    extracting a first output laser light from the gain medium at a second wavelength that substantially matches a wavelength of any of a P-branch, Q-branch, and R-branch transition between the b $^1\Sigma^+$ electronic state and a x $^3\Sigma^-$ ground electronic state of the SO molecule.

15. The method of claim 14, wherein the second wavelength matches an emission transition between a v'=0 vibrationless b $^1\Sigma^+$ electronic state of the SO molecule and a v=1 vibrational x $^3\Sigma^-$ ground electronic state of the SO molecule.

16. The method of claim 15, wherein the first wavelength is approximately 955 nanometers and the second wavelength is approximately 1070 nanometers.

17. The method of claim 14, wherein the second wavelength matches an emission transition between a v'=0 vibrationless b $^1\Sigma^+$ electronic state of the SO molecule and a v=0 vibrationless x $^3\Sigma^-$ ground electronic state of the SO molecule.

18. The method of claim 17, wherein the first wavelength is approximately 950 nanometers and the second wavelength is approximately 965 nanometers.

19. The method of claim 17, wherein the first wavelength is approximately 955 nanometers and the second wavelength is approximately 965 nm.

20. The method of claim 14, wherein the extracting involves generating a low power radiation at the second wavelength and directing the low power radiation through the gain medium, wherein the directing causes a high power radiation at the second wavelength to be extracted from the gain mixture to generate the first output laser light.

21. The method of claim 14, wherein the extracting involves resonating radiation at the second wavelength in a laser resonator cavity and emitting the radiation from the laser resonator cavity as the first output laser light.

22. The method of claim 14, further comprising:
    extracting a second output laser light from the gain medium at a third wavelength that substantially matches a wavelength of a P-branch transition between the b $^1\Sigma^+$ electronic state and the x $^3\Sigma^-$ ground electronic state of the SO molecule;
    gathering the first output laser light and the second output laser light; and
    focusing the gathered laser light to a single spot in the far field.

23. An apparatus comprising:
    a laser gain medium comprising gaseous sulfur monoxide (SO) and at least one buffer gas;

a vessel containing the gain medium;

a near infrared pump light source that generates a pump light of a first wavelength directed to the gain medium contained in the vessel, wherein the first wavelength substantially matches a wavelength of any of a Q-branch and a R-branch absorption transition of a $b\ {}^1\Sigma^+$ electronic state of a molecule of the gaseous SO;

a master oscillator that generates radiation at a second wavelength that substantially matches an emission transition of the molecule of the gaseous SO; and at least one optical component that directs the radiation from the master oscillator through the vessel, wherein the radiation extracts power from the laser gain medium to generate an output radiation.

24. The apparatus of claim 23, wherein the emission transition is between a $v'=0$ vibrationless $b\ {}^1\Sigma^+$ electronic state of the molecule of the gaseous SO and a $v=1$ vibrational $x\ {}^3\Sigma^-$ ground electronic state of the molecule of the gaseous SO.

25. The apparatus of claim 24, wherein the first wavelength is approximately 955 nanometers and the second wavelength is approximately 1070 nanometers.

26. The apparatus of claim 23, wherein the emission transition is between a $v'=0$ vibrationless $b\ {}^1\Sigma^+$ electronic state of the molecule of the gaseous SO and a $v=0$ vibrationless $x\ {}^3\Sigma^-$ ground electronic state of the molecule of the gaseous SO.

27. The apparatus of claim 26, wherein the first wavelength is approximately 950 nanometers and the second wavelength is approximately 965 nanometers.

28. The apparatus of claim 26, wherein the first wavelength is approximately 955 nanometers and the second wavelength is approximately 965 nanometers.

\* \* \* \* \*